May 6, 1941.  H. S. JANDUS  2,240,783
TOGGLE BRAKE LEVER
Filed March 4, 1939  4 Sheets-Sheet 2
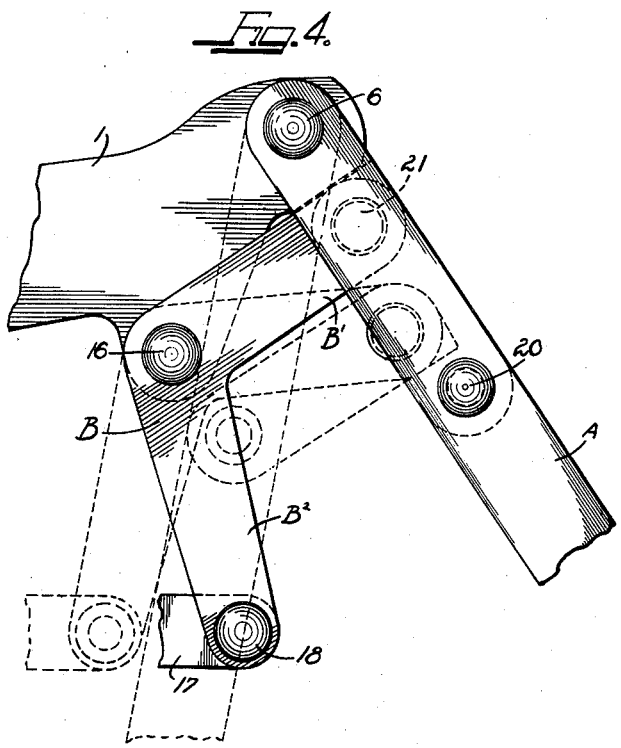
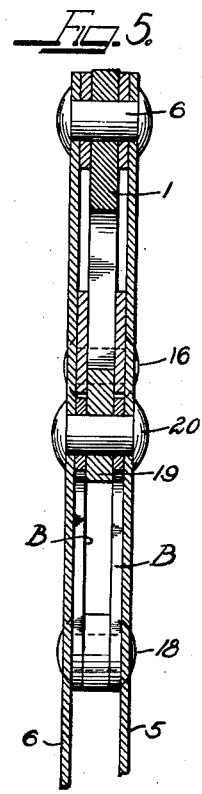
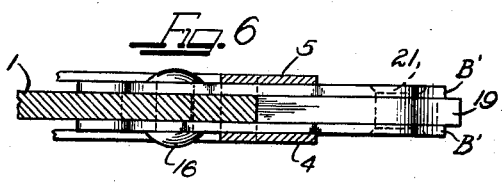
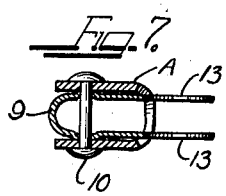
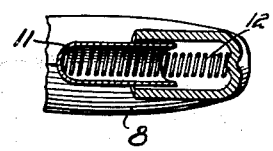
Inventor
HERBERT S. JANDUS
by May 6, 1941.  H. S. JANDUS  2,240,783
TOGGLE BRAKE LEVER
Filed March 4, 1939  4 Sheets-Sheet 3
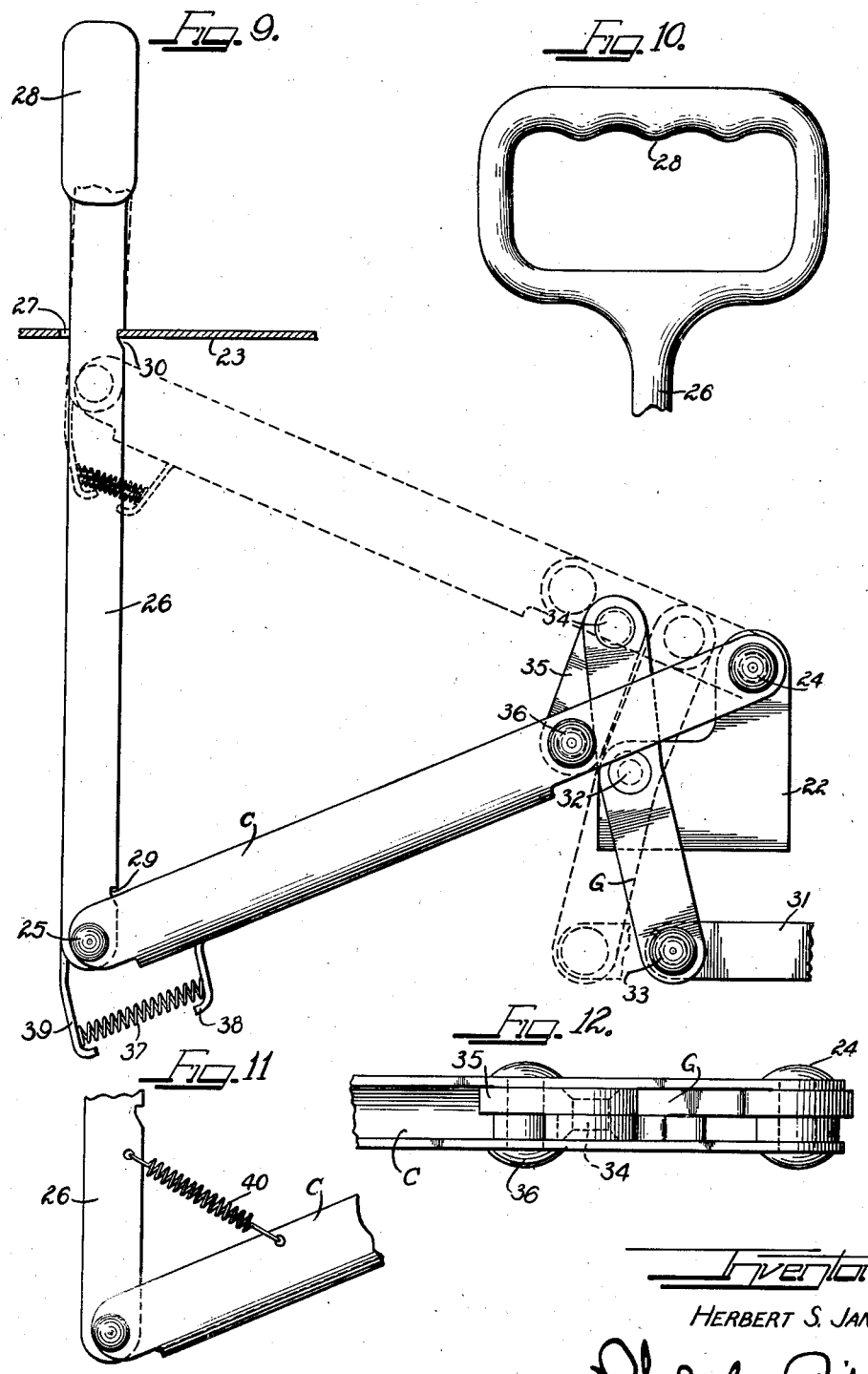
Inventor
HERBERT S. JANDUS

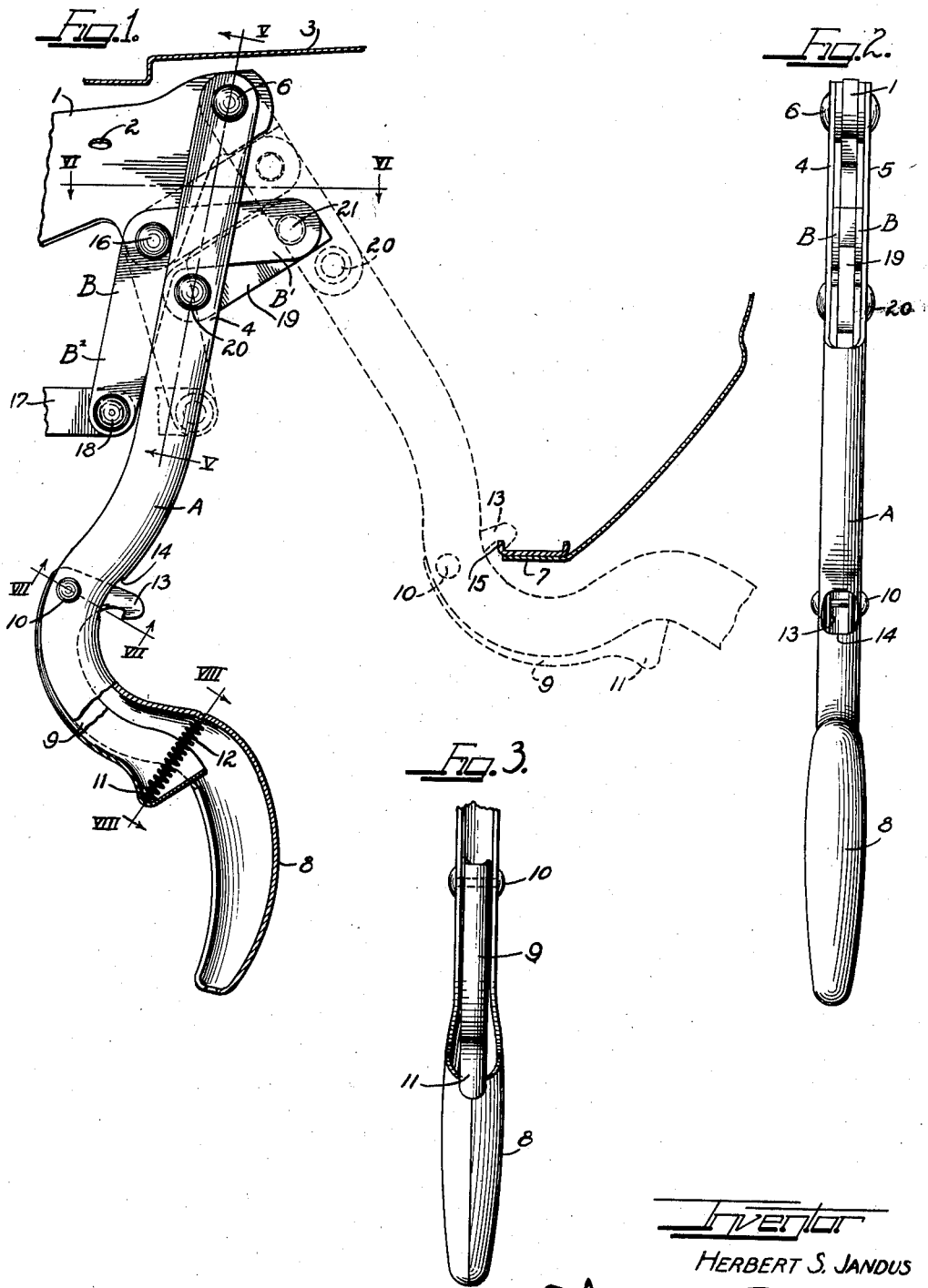

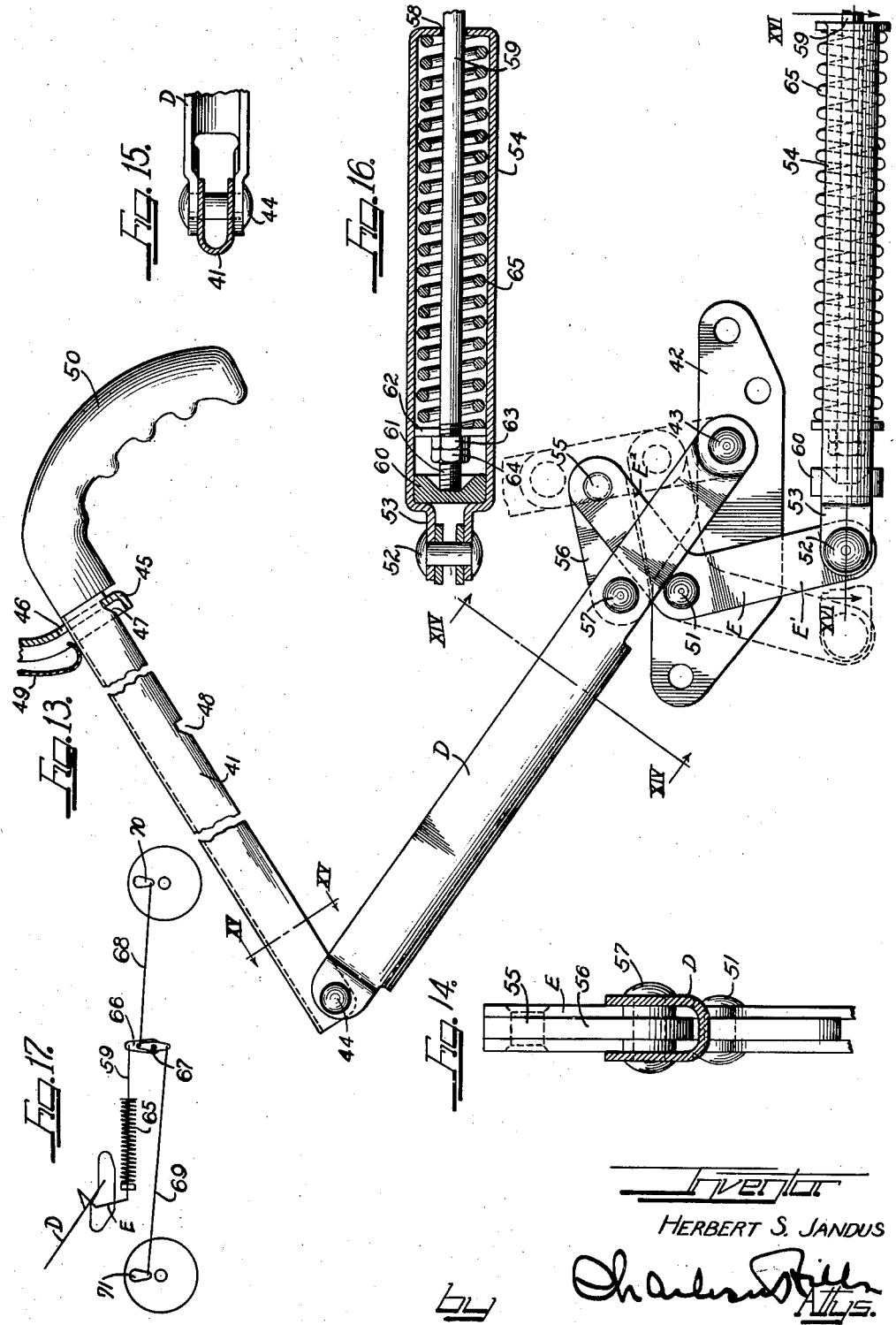

UNITED STATES PATENT OFFICE 2,240,783

TOGGLE BRAKE LEVER

Herbert S. Jandus, Detroit, Mich., assignor to Houdaille-Hershey Corporation, Detroit, Mich., a corporation of Michigan Application March 4, 1939, Serial No. 259,870

13 Claims. (Cl. 74—520)

The present invention relates to an automotive brake lever construction, particularly a parking brake construction, utilizing toggle action for actuating the brake mechanism in accordance with the swing of the lever, and in which the lever and connected mechanism are held in "set" or applied position by substantially right-angular relationship of the parts constituting the toggle.

An object of the present invention is to provide a parking brake lever construction which may be made of stamped parts without need for close manufacturing limits, and which lever does not depend on pawl and ratchet or friction clutching members to hold it in "set" or applied position.

Another object of the present invention is to provide an automotive vehicle parking brake construction in which the lever is moved to its full amplitude of swing, with no intermediate stopping point, in connection with which means are introduced in the brake take-off to compensate for condition of wear of the brake bands, and which allows full swing of the lever with such movement of brake take-off as is commensurate with the wear of the brake bands, to thereby effect proper setting of the brakes regardless of the worn condition of the bands or drums.

A further object of the present invention is to provide a parking brake lever construction with parts constituting toggle links arranged so that when the lever is in "set" position, one link is substantially coincident with the lever member and the axis of the knee pivot is in line with the lever pivot and the pivotal connection of said one link to the lever, to thereby hold the lever and brakes in "set" position.

Another and further object of the present invention is to provide an automotive vehicle parking brake construction in which the brake is held in "set" or applied position by toggle action.

The invention has for a further object the provision of an automotive vehicle parking brake construction in which linkage is employed to operatively connect the brake lever to the brake pull rod, with the linkage arranged to act with toggle action to hold the brake and lever in "set" or applied position.

The invention has for another object the provision of a parking brake construction in which the lever is moved from its fully "off" position to fully "set" position, with no intermediate stopping point, and held in "set" position without cooperating clutching means.

Generally speaking, the invention contemplates the utilization of a bell crank pivoted adjacent the lever pivot, and preferably to the bracket which supports the lever, to one end of which crank the brake pull rod or cable is connected, while the other end of the bell crank is joined to the brake lever by a link, said link and the leg of the bell crank to which it is pivoted constituting toggle legs or links which move to acute angular relationship when the lever is in "off" position and to substantially right-angular relationship when the lever is in "set" position, the right-angular relationship serving to hold the lever in its "set" position and prevent brake pull imposed on the bell crank from moving the lever in retrograde direction.

The invention contemplates the formation and relationship of the bell crank and link as such that when the lever is moved to "set" position, the link is substantially coincident with the center line of the lever and the axis of the knee or pivotal connection between the bell crank and link is in line with the axis of the lever pivot and the pivotal connection of the link to the lever. In other words, the axis of the knee is on dead center.

The above, other and further objects of the present invention will be apparent from the following description and accompanying drawings.

The accompanying drawings illustrate various embodiments of the present invention, and the views thereof are as follows:

Figure 1 is a side elevational view of a brake lever of the dash or cowl type, with parts in elevation and parts in section, showing in full lines the relationship of the parts when the lever is in "off" position, and in dotted lines when the lever is in "set" position.

Figure 2 is an edge view of the lever of Figure 1, looking at the right-hand edge of the lever.

Figure 3 is a fragmental portion of the opposite edge of the grip portion of the lever, looking at the left-hand edge thereof, as shown in Figure 1.

Figure 4 is a fragmental view of a portion of the lever, the bell crank and link, showing in full lines the relationship of the parts when the lever is in "set" position, and in dotted lines the relationship of the parts when the lever is in "off" position.

Figure 5 is a fragmental sectional view taken substantially in the plane indicated by the line V—V of Figure 1.

Figure 6 is a transverse sectional view taken substantially in the plane indicated by the line VI—VI of Figure 1.

Figure 7 is a transverse sectional view taken substantially in the plane indicated by the line VII—VII of Figure 1.

Figure 8 is a view, partially in transverse section and partially in plan, taken substantially in the plane indicated by the line VIII—VIII of Figure 1.

Figure 9 is a side elevational view of the lever construction of the present invention arranged for operation by means of a vertically movable handle extending through the floor board of a vehicle, showing in full lines the parts in "off" position.

Figure 10 is an elevational view of the grip portion of the handle of the arrangement of Figure 9.

Figure 11 is a fragmental elevational view of the connection between the handle and the lever member, showing a tension spring to hold the handle in hooked engagement with the floorboard.

Figure 12 is a top plan view of the linkage of Figure 9 and a fragmental top plan view of the lever.

Figure 13 is a side elevational view of the present invention adapted for manipulation by an inclined push-pull handle operating through the instrument board of the vehicle.

Figure 14 is a transverse sectional view, taken substantially in the plane indicated by the line XIV—XIV of Figure 13.

Figure 15 is a transverse sectional view, taken substantially in the plane indicated by the line XV—XV of Figure 13.

Figure 16 is a longitudinal view of the illustrated form of compensation mechanism, taken substantially in the plane indicated by the line XVI—XVI of Figure 13.

Figure 17 is a diagrammatic view of a brake system embodying the present invention.

The drawings will now be explained.

In Figures 1, 2 and 3, there is illustrated a lever of the dash or cowl type arranged with the toggle mechanism of the present invention. A fragmental portion of an attaching bracket, or stationary member, is shown at 1, which bracket is provided with holes 2, through which rivets or other attaching means may pass to secure it in place behind the cowl and underneath the upper finish 3 of the vehicle.

A lever or operating member A is shown formed as a stamping with its body portion of U-shape configuration, with legs 4 and 5 arranged to straddle the plate 1 and thereto pivoted at 6 by a suitable rivet or other pivot pin. The shank portion of the lever is bent in somewhat S-shape, so that when the lever is moved to set the brakes, it may clear the lower margin of the instrument board shown at 7. The grip portion 8 of the lever is hollow, enclosed and curved to be comfortably gripped by the vehicle operator.

A latch member 9 is pivoted at 10 to the lever member and works in the slot defined by the side walls of the shank. A portion of the latch is struck out, as at 11, to form a trigger for manipulation by the forefinger of the operator. A spring 12 is arranged between the web of the lever member and the latch member, tending normally to maintain the trigger portion projected. A notched end piece 13 projects forwardly through an aperture 14 in the web of the lever member and is adapted to engage a margin or ledge 15 formed on the instrument board, as shown in Figure 1.

The latch has been illustrated and described, although it is not an important feature of the present invention. However, under some circumstances, a car manufacturer may require such a latch, in which event it would be installed as described.

A bell crank or actuating member B having legs B1 and B2, the latter being shown as the longer, is pivoted at 16 to the mounting plate or stationary member 1. To the lower end of the leg B2, a brake take-off or reciprocatory member 17 is pivoted at 18. The load or resistance take-off connection may be in the form of a rod or cable. In any event, the brake mechanism is connected to the leg B2 of the bell crank.

A link 19 is pivoted at 20 to the legs of the lever member A, and at its outer end is pivoted at 21 to the shorter or adjacent leg B1 of the bell crank. The leg B1 and the link 19 constitute links or legs of a toggle, with the pivot 21 constituting the knee or knuckle. The leg B1 and the link 19 work between the legs of the lever member, as clearly shown.

When the lever member is in "off" position, the link 19 and leg B1 are in acute angular relationship. The lever A occupies but two positions; one, "off" position, which is that shown in full lines in Figure 1, and the other, "set" position, which is that shown by dotted lines in Figure 1. There is no intermediate stopping point for the lever member. Consequently, in order to apply the brakes, the lever member must be moved from the fully "off" position to the fully "set" position.

As the lever member is moved from "off" position to "set" position, the link 19 at its pivotal connection 20 to the lever is swung in counterclockwise direction as viewed in Figure 1. Such movement urges the knee 21 upwardly. The construction is such that when the lever member A is in fully "set" position, the link 19 coincides with the lever member and the axis of the knee 21 is aligned with the axis of the lever pivot 6 and the pivotal connection 20 of the link to the lever member, thus moving the axis of the knee to dead center. In this position, the link 19 is at substantially right angles with respect to the leg B1, occupying the position shown in dotted lines in Figure 1 and in full lines in Figure 4. In this position, tendency of the pull imposed on the bell crank by the brake mechanism to swing the bell crank in retrograde direction is resisted. The parts therefore are held in "set" position by the toggle action described.

In such "set" position, if the latch 9 is employed, the hooked end 13 would engage over a stop or keeper 15, such as shown in Figure 1, to prevent any accidental force applied against the lever from releasing the brakes. The toggle action has been found sufficient to hold the parts in "set" position without the use of the latch, the latch being merely a safety feature or precautionary device utilized to prevent accidental release of the brakes.

An advantage of the lever just described is that all of the parts may be made as stampings, thus eliminating any need for close manufacturing limits or tolerances, thereby reducing manufacturing costs.

With the bell crank B arranged and functioning as described, it will be observed that as the lever A moves from its "off" position to its "set" position, an amplitude of approximately 45 degrees, the bell crank is moved at a variable speed, with its lower end, that is, the one connected to the take-off 17, starting rapidly and slackening speed as it approaches the end of its amplitude of movement. It is therefore possible to apply a very heavy load to the brake take-off, so that the lever of the present invention accommodates itself very readily for use as a parking brake lever for automotive vehicles.

Inasmuch as the lever member must be moved from end to end of its amplitude, with no intermediate stopping point, means must be provided for compensating for the wear of the brake bands and other parts of the brake mechanism susceptible of wear in use. One such compensating means may be that of the character illustrated in Figures 13 and 16 which will later be described. In this connection, it may be noted that when the brake bands are new, a slight movement of the brake rod will be necessary to set the brakes. However, as the lever of the present invention must be moved to its limit of movement in brake applying direction, some compensation must be provided when the brake bands are worn and the brake rod moves a greater distance before the brakes are set.

One of the ways by which this compensation may be made is by interposing a spring in the brake-pull line which is preloaded to a definite load, say, two hundred pounds. With such an arrangement, the lever will act normally until the pull on the brake rod reaches 200 pounds, whereupon the spring will become compressed and will allow the brake lever to be moved to the end of its movement in brake applying direction and maintaining the brakes set. As the spring is compressed, the load on the brake rod is increased above that for which the spring is pre-loaded, so that there is no question but that the brakes will be normally applied to hold the vehicle against movement.

Another manner of compensating for the excess motion mentioned is to allow greater clearance of movement between the brake drums and the brake shoes. By this, it is meant that the brake shoes might be set farther away from the drums than is now the practice, so that the initial movement of the brake lever may occur and take up the slack, this proceeding until the lever reaches its end of travel in setting direction, whereupon the shoes will be tightly engaged with the drums.

Figure 1 illustrates in full lines the position of the bell crank and link when the lever is in "off" position. In Figure 4, the bell crank and link are illustrated in full lines when in "set" position. It is to be noted, however, that inasmuch as the link in its "set" position is housed between the legs of the lever, its full line outline may not be readily observed.

In Figures 9 to 12, inclusive, the present invention is shown as applied to a lever construction in which a mounting bracket 22 is secured to the vehicle frame below the floor 23. A lever C is pivoted to the bracket at 24 and has pivoted to its other end at 25 a handle 26 which extends upwardly through an opening 27 in the floor where at its upper end it is provided with a grip 28. The handle 26 is provided with two notches 29 and 30 for engaging the margin of the aperture 27 in the floor to latch the lever in either of two positions. Figure 9 shows the handle with the notch 30 in latched engagement. In this figure, the parts are in "off" position. To apply the lever, the operator grasps the grip 28 and pulls it upwardly until the notch 29 engages a margin of the aperture 27, whereupon the lever C reaches the end of its movement in brake-applying direction and the brakes connected to the take-off member 31 are set. A suitable keeper may be secured adjacent the margin of the aperture.

In this form of the invention, a bell crank G is pivoted at 32 to the bracket 22, its lower end is pivoted at 33 to the load take-off or connection 31, while its upper end is pivoted at 34 to one end of a link 35, the other end of the link being pivoted at 36 to the lever C. When the lever C has been moved to its "set" position, that is, when the handle 26 has been elevated, the link 35 is coincident with the length of the lever C, and the axis of the knee 34 is in alignment with the axis of the pivot 24 and the pivot 36, thereby locking the lever in "set" position.

The handle 26, when used, is arranged to be moved vertically in front of the seat. As may be noted, to disengage either of the notches from engagement with the aperture 27, the handle portion would be pushed to the left. In order to insure engagement of the notches with the aperture 27, spring means may be used. In Figure 9, such spring means includes a coil spring 37 working between lugs 38 and 39 struck respectively from the lever C and handle 26. In Figure 11, a tension spring 40 is secured at its ends to the lever C and handle 26 respectively and acts to urge the handle 26 to the right, as viewed in the drawings.

The form of the invention illustrated in Figure 13 utilizes a bar or handle member 41 adapted for straight-line pull-push effort, working in a line adjacent and substantially parallel to the steering column. In this form of the invention, a plate 42 is suitably secured to the framework of the vehicle below the floor. A lever D is pivoted at one end at 43 to the plate 42 and at its other end is pivoted at 44 to the adjacent end of the bar 41. The lever extends upwardly and forwardly, while the bar 41 extends upwardly and rearwardly. Any suitable means may be employed for supporting the bar 41, the means here illustrated comprising an extension or keeper 45 of the instrument board provided with an aperture 46 through which the bar works. The lower margin of the bar is notched at 47 and 48, which notches engage with a margin of the aperture of the keeper for latching the bar against movement to the left; that is, in retrograde direction. A spring 49, working against the bar, may be utilized for maintaining either of its notches in latched engagement with the extension. An umbrella-like handle or grip portion 50 is applied to the bar 41 for ease in moving it.

In this form of the invention, a bell crank E is pivoted at 51 to the bracket 42, with the lower end of its leg $E_1$ pivoted at 52 to ears 53 of a spring casing 54. The leg $E_2$ is pivoted at 55 to one end of a link 56, the other end of the link being pivoted at 57 to the lever D.

Figure 13 shows in full lines the relationship of the parts when the lever is in "off" position. To apply the brakes, the handle 50 is grasped and pulled to the right, whereupon the lever D is swung in clockwise direction, the link 56 being moved into coincidence with the lever, thus bringing the axis of the pivot 55 into alignment with the axes of the pivots 43 and 57, on dead center, and holding the toggle against retrograde movement under the influence of brake pull. When in "set" position, the notch 48 of the bar 41 is latched in a margin of the aperture 46 of the extension 45.

The casing or strap 54 is formed as a stamping with ears 53 at one end apertured to receive the pivot 52. The other end of the strap or casing is apertured at 58 to receive a pull rod 59. The end of the rod 59 extends within the casing or strap 54 towards the lugs 53, where it strikes an abutment 60 held in place within the strap. This end of the pull rod is threaded at 61. A washer 62 bears against a nut 63 held in place by lock nut 64, and between the washer 62 and the opposite end of the strap or casing a spring 65 is interposed. This spring tends to move the threaded end of the pull rod 59 to the left and the casing or strap 54 to the right, so that the normal position of the parts is that illustrated in Figure 16.

The spring 65 may be pre-loaded to a definite point, say, 200 pounds. The load is connected to the rod 59 in any suitable manner. With such an arrangement, when the brake mechanism connected to the ears 53 of the strap or casing 54 is moved to the left, the lever will act normally and the rod 59 will move with the strap or casing 54 until the pull on the brake rod 59 reaches the load point for which the spring is pre-loaded; that is to say, 200 pounds. During such movement, slack has been taken up in the brakes, so that the shoes are now ready to engage the drums with holding action. It is to be remembered that such initial movement occurs with initial movement of the lever, and the point of load of the spring is reached before the lever reaches its fully "set" position. When the pull on the brake rod reaches the load of the spring, the casing or strap 54 will continue to move to the left, compressing the spring, this movement continuing until the brake lever reaches its fully "set" position.

In compressing the spring as described, the pull imposed on the brake rod 59 is increased above that of the pre-loading of the spring, so that the brakes are applied with holding action, the load increasing as the spring is compressed.

It will be observed that the lever of the present invention occupies one of only two positions, viz., "off" and "set," and has a definite range of movement. The displaceable brake members, such as the brake shoes, on the other hand, have variable range of movement—within certain limits—due to the wear of the brake shoe linings. The movement is at a minimum when the linings are new and all slack is taken up in the brake mechanism. The movement increases as the linings wear and looseness occurs in the brake mechanism.

The illustrated form of compensation means assures full application of the brakes, regardless of the worn condition of the linings, whenever the lever is moved to "set" position through its definite range, as the spring is designed for the purpose, and, it is understood, may be used with any of the brake lever adaptations herein shown.

Figure 17 illustrates, schematically, an automotive vehicle brake mechanism embodying the present invention with the lever as of the arrangement of Figure 13, with the pull rod 59 connected to a crank 66, which rocks a transverse shaft 67 for imposing pull on the connections 68 and 69 to the shoe operating cam cranks 70 and 71, of the rear and front brakes, in a manner well understood.

The invention has been described herein more or less precisely as to details, yet it is to be understood that the invention is not to be limited thereby, as changes may be made in the arrangement and proportion of parts, and equivalents may be substituted, without departing from the spirit and scope of the invention.

The invention is claimed as follows:

1. The combination with a stationary member, of a reciprocatory tension member, an actuating member pivoted to said stationary member and engaging said reciprocatory member, an operating member pivoted to said stationary member to swing, a link connection between said actuating member and said operating member for rocking said actuating member to shift said reciprocatory member against tension exerted thereby, said link and actuating member being connected as a toggle with the center line of the link movable into and out of coincidence with the center line of the operating member, tension exerted by said reciprocatory member normally urging said link away from coincidence with the center line of the operating member, said link when in coincidence with said operating member acting against said actuating member in approximately right angular relationship to hold said members in stable set position and to normalize the tension exerted by said reciprocating member.

2. A lever mechanism for applying and releasing brakes or similar mechanism comprising a hand lever having a definite range of movement arranged to be held in adjusted position in only two positions, means connected to said lever through which the brakes are applied or released when said lever is moved to one of said two positions, said connecting means including parts pivoted to each other and means for inducing a preloaded resistance to relative movement therebetween to thereby permit full movement of said lever to one of its two positions, said pivoted parts being operative with toggle action to hold said lever in one of its two adjustable positions against pull imposed by the brakes when said parts are in right-angular relationship only.

3. A manually operable mechanical movement comprising a manually operable lever of the second class pivoted at one end to a fixed support; a bell crank pivoted at its angle to said fixed support; a link pivoted at one end to one end of said crank and at the other end to said lever with the link and adjacent arm of the crank constituting a toggle and the pivotal connection between them constituting the toggle knee; and a load member connected to the other end of said crank; the parts being so arranged that when the knee is in alignment with the pivotal connection of the lever to its support and the pivotal connection of the link to the lever, the link and the adjacent toggle arm of the bell crank are in stable right angular relationship to thereby hold the lever in adjusted position.

4. In a parking brake lever arrangement, in combination, a plate support, a lever member formed of sheet metal to substantially U-shaped cross section and having legs astraddle said plate and thereto pivoted, a stamped bell crank pivoted at its angle to said plate and having one arm projecting between said lever member legs, a stamped link pivoted at one end to said lever member between said legs and projecting between said legs and at its other end pivoted to the end of said one arm of said bell crank, said link and said one arm of said bell crank constituting a toggle with the pivot between them constituting a knee, a load member connected to the end of the other arm of said bell crank, the construction being such that when in "off" position said one arm of said crank and said link projects through and between the lever legs substantially transversely of the lever member and make an acute angle with each other and when in "set" position said link is coincident with and between the lever leg and makes a right angle with said one arm of said bell crank in stable holding relation.

5. A manually operable mechanical movement comprising a manually operable lever of the second class pivoted at one end to a fixed support; a bell crank pivoted at its angle to said fixed support; a link pivoted at one end to one end of said crank and at the other end to said lever with the link and adjacent arm of the crank constituting a toggle and the pivotal connection between them constituting the toggle knee; and a load member connected to the other end of said crank; the parts being so arranged that when the knee is in alignment with the pivotal connection of the lever to its support and the pivotal connection of the link to the lever, the link and the adjacent toggle arm of the bell crank are in stable right angular relationship to thereby hold the lever in adjusted position, said lever member carrying a latching member for engaging a fixed member to hold said toggle in said right angular relation.

6. A parking brake arrangement for automotive vehicles comprising, in combination, a fulcrum plate fixed below the vehicle floor board, a lever member pivoted at one end to said plate to swing in a vertical plane, a vertically extending handle member connected to the other end of said lever member and projecting upwardly through the vehicle floor in front of the driver's seat, said handle member and floor having cooperating means for latching said handle member in adjusted vertical position when said lever is in "off" position, and toggle connections between said lever member and the brake mechanism to set and release the brake as said lever member is swung by said handle member.

7. A parking brake arrangement for automotive vehicles comprising, in combination, a fulcrum plate fixed below the vehicle floor boards, a lever member pivoted at one end to said plate to swing in a vertical plane, a vertically extending handle member connected to the other end of said lever member and projecting upwardly through the vehicle floor in front of the driver's seat, said handle member and floor having cooperating means for latching said handle member in adjusted vertical position when said lever is in "off" position, toggle connections between said lever member and the brake mechanism to set and release the brake as said lever member is swung by said handle member, and spring means operative between said lever membr and handle member for urging said handle member to latched engagement with said floor when the lever member is in "off" position, and the parts constituting said toggle means being movable to right angular relationship and capable of holding said lever member in "set" position when the lever member is moved to that position.

8. A parking brake arrangement for automotive vehicles comprising, in combination, a fulcrum plate adapted to be attached in position below the floor board of a vehicle, a lever member pivoted at one end to said fulcrum plate to swing in a vertical plane, a push-pull handle member connected to the other end of said lever member and available adjacent the margin of the instrument board for longitudinal movement, means for preventing retrograde movement of said handle member when in "off" position, and toggle means operatively connecting said lever member to the brake mechanism, the parts constituting said toggle means being capable of assuming right-angular relationship when the lever member is in "set" position to thereby hold said lever member in "set" position by reason of said right-angular relationship.

9. An automobile parking brake arrangement including in combination with an instrument board of the automobile, a brake operating mechanism including a longitudinally movable handle member supported by said instrument board and having a grip portion at one end and connected at the other end with a lever member, a fulcrum plate adapted to be secured in place below the vehicle floor boards, a stamped U-shape lever member having spaced legs at one end astraddle and pivoted to said plate and at its other end having spaced lugs for pivotal connection to said other end of said handle member, a stamped bell crank pivoted at its angle to said plate and arranged with one arm projecting between the said legs of said lever member, a link pivoted at one end to said lever member between said legs and at the other end pivoted to the end of said one arm of said crank on the side of said lever remote from the crank pivot, brake mechanism pivoted to the other arm of said crank, said link and said one arm of said crank constituting a toggle, the parts being so arranged that when the lever member is in "off" position, the toggle parts make an acute angle with each other and each of said toggle parts makes an acute angle with the lever member with the toggle parts inclined toward the pivotal connection of the lever to said plate and when the lever member is in "set" position said toggle parts are in right angular relationship stabilized to hold said lever member against retrograde movement.

10. A mechanical movement as specified in claim 3 in which the manually operable lever is a jointed two-part lever, one of said parts being pivoted to the fixed support and the other of said lever parts constituting a handle portion by which said one lever part is actuated.

11. A mechanical movement as specified in claim 3 in which the manually operable lever is a jointed two-part lever, one of said parts being pivoted to the fixed support and the other of said lever parts constituting an inclined longitudinally movable handle portion by which said one lever part is swung in use.

12. A lever mechanism for applying and releasing brakes or similar mechanism comprising a hand lever arranged to swing about a fixed pivot, means for applying and releasing the brakes when the lever is swung about its pivot, and additional means connecting said first means and said lever, said additional means including parts pivoted to each other with one of said parts being connected to said first means at a point other than the pivotal connection between said parts, said pivoted parts being in acute angular relationship with each other when said lever is in a position fully releasing the brakes and in right-angular relationship when the lever is in a position fully applying the brakes.

13. A lever mechanism for applying and releasing brakes or similar mechanism comprising a lever arranged for pivotal connection to a support, an actuating member operable for applying and releasing the brakes when said lever is swung on its pivot, toggle members pivoted together, one of said toggle members being pivotally connected to said lever and the other of said toggle members being pivotally connected to said brake actuating member, said last pivotal connections being at points other than the pivotal connection between the toggle members, said toggle members being in acute angular relationship in any position but full brake applied position, said toggle members when in the latter position being in right-angular relationship and coacting with said lever to hold it in said one adjusted position.

HERBERT S. JANDUS.